June 6, 1967　　　MASAYUKI FUTAMATA　　　3,323,607

COMBINED SPEED CONTROL AND STEERING DEVICE FOR VEHICLES

Filed March 12, 1965

INVENTOR.
MASAYUKI FUTAMATA
BY
ATTORNEYS

United States Patent Office 3,323,607
Patented June 6, 1967

3,323,607
COMBINED SPEED CONTROL AND STEERING DEVICE FOR VEHICLES
Masayuki Futamata, Ota-ku, Tokyo-to, Japan, assignor to Kabushiki Kaisha Komatsu Seisakusho, Chiyoda-ku, Tokyo-to, Japan, a joint-stock company of Japan
Filed Mar. 12, 1965, Ser. No. 439,396
3 Claims. (Cl. 180—6.48)

This invention relates to a novel steering system for liquid pressure driven vehicles.

Vehicles for certain applications, such as public works, are provided with endless tracks on both sides thereof which are individually driven by hydraulic motors supplied with pressurized liquid from variable output liquid pumps. Ordinarily these vehicles are required to frequently change their direction of movement and also to turn in various directions in relatively limited spaces. Further, the operators of such vehicles are required to do many other operations in addition to steering of the vehicles.

Accordingly it is an object of this invention to provide a novel steering system which can be operated with one hand.

Another object of this invention is to provide a novel steering system for liquid pressure driven vehicles which enables the vehicles to frequently change their direction of movement and also to turn in limited spaces.

In a preferred embodiment of this invention, the running gear such as endless tracks on both sides of a vehicle are individually driven by hydraulic motors supplied with liquid pressure from a pair of liquid pressure pumps of variable output type having output regulating means. A control lever mounted on a frame to be tiltable in any direction is provided. A bevel gear is connected to the control lever to be rotated in response to the tilting motion of the control lever, and a pair of bevel gears having the same number of teeth and mounted on coaxial shafts journalled in said frame are provided to mesh with said bevel gear. Furthermore, motion transmitting means are provided respectively between said coaxial shafts and said output regulating means. With this construction, by tilting back and forth the control lever in one plane, the direction of running of the vehicle can be readily reversed and the speed in the selected direction can be varied smoothly. By tilting the control lever in another plane perpendicular to said plane, the vehicle can be turned, either in the clockwise or counter clockwise direction, around its vertical axis. Further, by tilting the control lever in any other plane than said orthogonal planes the vehicle can be turned in either direction by any desired angle while running in the forward or backward direction. Thus this steering system provides a very versatile control and can be operated with one hand.

Further objects of the invention together with its benefits and advantages will be fully understood upon reference to the detailed description which follows, particularly taken in conjunction with the drawing annexed hereto in which like parts are designated by like reference characters, and in which.

Figure 1:
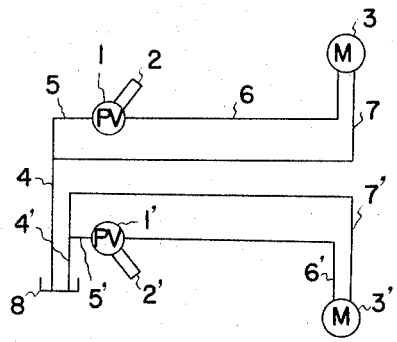
FIG. 1 is a diagrammatic representation of a liquid circuit for use on a vehicle utilizing a liquid pressure pump of the variable output type.

Referring now to FIG. 1 of the accompanying drawing, the liquid circuit shown therein comprises two pumps 1 and 1' of the variable output type equipped with output regulators 2 and 2', respectively, two hydraulic motors 3 and 3' driven by liquid pressure supplied from said pumps and reservoir 8 of the operating liquid which are connected as shown by liquid pipe lines 4, 4', 5, 5', 6, 6', 7 and 7'. Thus, pumps 1 and 1' are arranged to be driven by suitable prime movers, not shown, to individually drive the hydraulic motors 3 and 3' on the opposite sides of the vehicle. The speeds of hydraulic motors 3 and 3' can be varied independently by independently manipulating the output regulators 2 and 2' so that it is possible to steer the running gear not shown, such as endless tracks driven by the motors in any desired manner both in the forward and reverse running directions.

Figure 2:
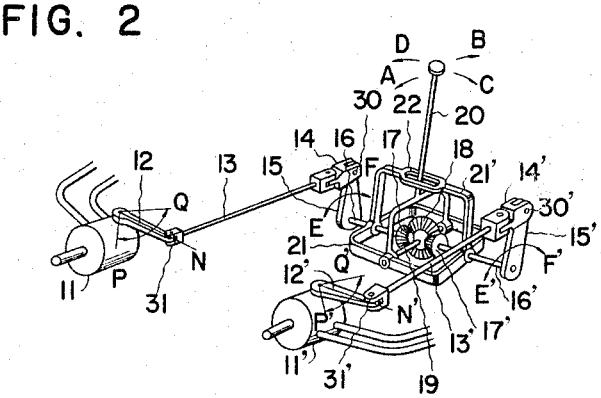
FIG. 2 is a perspective view of a steering system embodying this invention.
Figure 3:
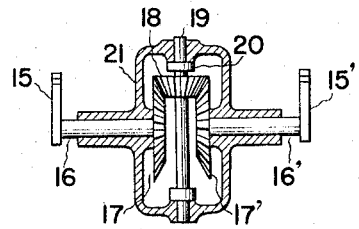
FIG. 3 is an enlarged view of a gear mechanism utilized in the steering device.

Referring now to FIGS. 2 and 3, reference numerals 11 and 11' designate liquid pressure pumps of the variable output type corresponding to the liquid pressure pumps 1 and 1' of FIG. 1 and are respectively equipped with levers 12 and 12' for regulating their outputs. These levers are so arranged that when they are operated from the neutral positions N and N' toward the positive positions P and P', the outputs in the positive direction are increased, whereas when they are operated from the neutral positions N and N' toward negative positions Q and Q', the outputs in the negative direction are increased. The direction of running and the speed of the vehicle are controlled by a control lever 20 which is manipulated in the following manner. When it is moved from B to A, the vehicle is propelled in the forward direction, and when it is moved from A to B, the vehicle is propelled in the reverse direction. When it is moved from D to C while it is in the forward position, the vehicle is turned in the counter clockwise direction, and when it is moved from C to D, the vehicle is turned in the clockwise direction.

Similar controls are also possible in the reverse position. A shaft 19 is connected to the forked lower end of the lever 20, the opposite ends of the shaft 19 being journalled by a square frame 21. Secured to the shaft 19 is a bevel gear 18 meshing with a pair of bevel gears 17 and 17' having the same number of teeth, as shown in FIG. 3. The gears 17 and 17' are respectively mounted on coaxial stub shafts 16 and 16' which are perpendicular to the shaft 19 and are provided with crank arms 15 and 15' at their outer ends. A U-shaped member 21' is connected to the frame 21, which is provided with an elongated slot 22 through which the control lever 20 projects. As shown in FIG. 2 the frame 21 and the U-shaped member 21' are supported by stub shafts 16 and 16' to be rotatable around them. The free ends of the crank arms 15 and 15' are respectively connected to universal couplings 14 and 14' through pins 30 and 30', which in turn are connected to the output regulating levers 12 and 12' of the pumps 11 and 11' through rods 13, 13' and pins 31, 31', respectively.

The liquid pressure driven vehicle is controlled as follows by the manipulation of the control lever 20:

(1) The control device is initially so adjusted that when the control lever 20 is held at the center point between positions A and B and also between C and D, the output regulating levers 12 and 12' of the pumps 11 and 11' will be at their neutral positions to reduce the output of both pumps to zero. In this state, as the outputs of pumps 11 and 11' are zero, the vehicle is at a standstill.

(2) If it is assumed that the control lever is tilted to the forward position A while in the neutral position between positions C and D, then the crank arms 15 and 15' will be rotated by the same angle in the directions indicated by arrows E and E' through bevel gears 18, 17 and 17'. Consequently, the regulating arms 12 and 12' will be rotated in the same direction by the same angle to provide the same outputs of both pumps, whereby the left side and right side motors 3 and 3' will be rotated at the same speed to propel the vehicle in the forward direction.

(3) If the control lever 20 is tilted to the reverse position B while in the neutral position with respect to positions C and D, the vehicle will be propelled in the reverse direction 4. If the control lever is tilted toward the position C while in the neutral position with respect to positions A and B, the bevel gear 18 will be rotated in the same direction as the control lever 20, thus rotating the crank arm 15 in the direction indicated by the arrow E while rotating the crank arm 15' in the opposite direction indicated by the arrow F'. Thus, the regulating lever 12 will be rotated in the negative direction Q', thus driving the hydraulic motors B and B' in the opposite directions at the same speed to turn the vehicle in one direction. If the vehicle is provided with endless tracks, it will be rotated about its vertical axis.

(5) If the control lever is tilted towards the position D, the vehicle will be rotated in the opposite direction in the same manner described in the just preceding paragraph.

(6) If the control lever is tilted in any plane other than two planes containing points A, B and C, D, respectively, the direction of the vehicle can be changed by any desired angle while it is running in the forward or reverse direction.

Thus, by manipulating the control lever 20 with one hand, the direction and speed of running as well as the direction of turning of a vehicle can be readily controlled. This is especially advantageous for vehicles provided with endless tracks in cases where the vehicles are required to frequently change their direction of running and to turn in limited spaces.

While the invention has been explained by describing a particular embodiment thereof, it will be apparent that improvements and modifications may be made therein without departing from the scope of the invention as defined in the appended claims.

What is claimed is:

1. A variable speed control and steering device for vehicles, such as endless track vehicles, having a pair of reversible and independently operable traction members, one at each side of the vehicle, said device comprising, in combination, a pair of drive means, each drivingly connected to a respective traction member; a source of power; a pair of controllers each controlling supply of power from said source to a respective drive means to vary the speed and direction of operation of the associated drive means; a substantially rectangular frame including spaced parallel side members interconnected by spaced parallel end members which are perpendicular to said side members; a pair of coaxial stub shafts, each having rotatable bearing engagement in a respective side member of said frame substantially intermediate the end members thereof; means connecting the outer ends of said stub shafts to said controllers whereby said controllers are adjustable by rotation of said stub shafts; a pair of bevel gears each mounted on the inner end of a respective stub shaft and arranged in axially spaced facing relation; a third shaft perpendicular to said stub shafts and having rotatable bearing engagement in both of said end members substantially intermediate said side members, and extending between said bevel gears, the axes of said stub shafts and said third shaft lying in substantially the same plane; a third bevel gear fixed to said third shift and meshing with both of said first-mentioned bevel gears whereby, upon rotation of said shaft, said third bevel gear will rotate said first-mentioned bevel gears in respective opposite directions; said frame being rockable about the common axis of said stub shafts; a substantially U-shape frame portion extending upwardly from said side members and including a base section extending transversely of said frame and substantially parallel to said stub axles; said base section having a centrally disposed slot therein extending longitudinally thereof and transversely of said frame; and a control lever extending through said slot for movement longitudinally of said slot while being restrained against movement transversely of said slot by engagement with the sides of said slot; said control lever having a forked inner end including a pair of arms fixedly secured to said third shaft adjacent a respective end member; whereby, upon movement of said control lever longitudinally of said frame, said frame will be tipped about the common axis of said stub shafts to conjointly rotate said stub shafts for conjoint operation of said controllers in the same direction and to the same extent and, when said control lever is moved laterally of said frame along said slot, said third shaft and said third bevel gear are rotated to rotate said first-mentioned bevel gears in opposite directions to rotate said stub shafts in opposite directions to adjust said controllers in opposed directions.

2. A combined speed control and steering device according to claim 1, wherein said means connecting said stub shafts and said controllers include a respective crank arm connected to each of said stub shafts and being pivotal therewith and having an arm portion connected to the associated controller.

3. A combined speed control and steering device according to claim 1, wherein each of said drive means comprises a variable speed fluid motor connected to a variable output pump constituting said source of power.

References Cited

UNITED STATES PATENTS

| 644,853 | 3/1900 | Fahl | 180 |
| 1,550,416 | 8/1925 | Barling | 180 |
| 2,941,609 | 6/1960 | Bowers et al. | 180—6.7 X |
| 3,181,389 | 5/1965 | Richard | 180—6.7 X |

BENJAMIN HERSH, *Primary Examiner.*

J. A. PEKAR, *Assistant Examiner.*